Patented Feb. 20, 1940

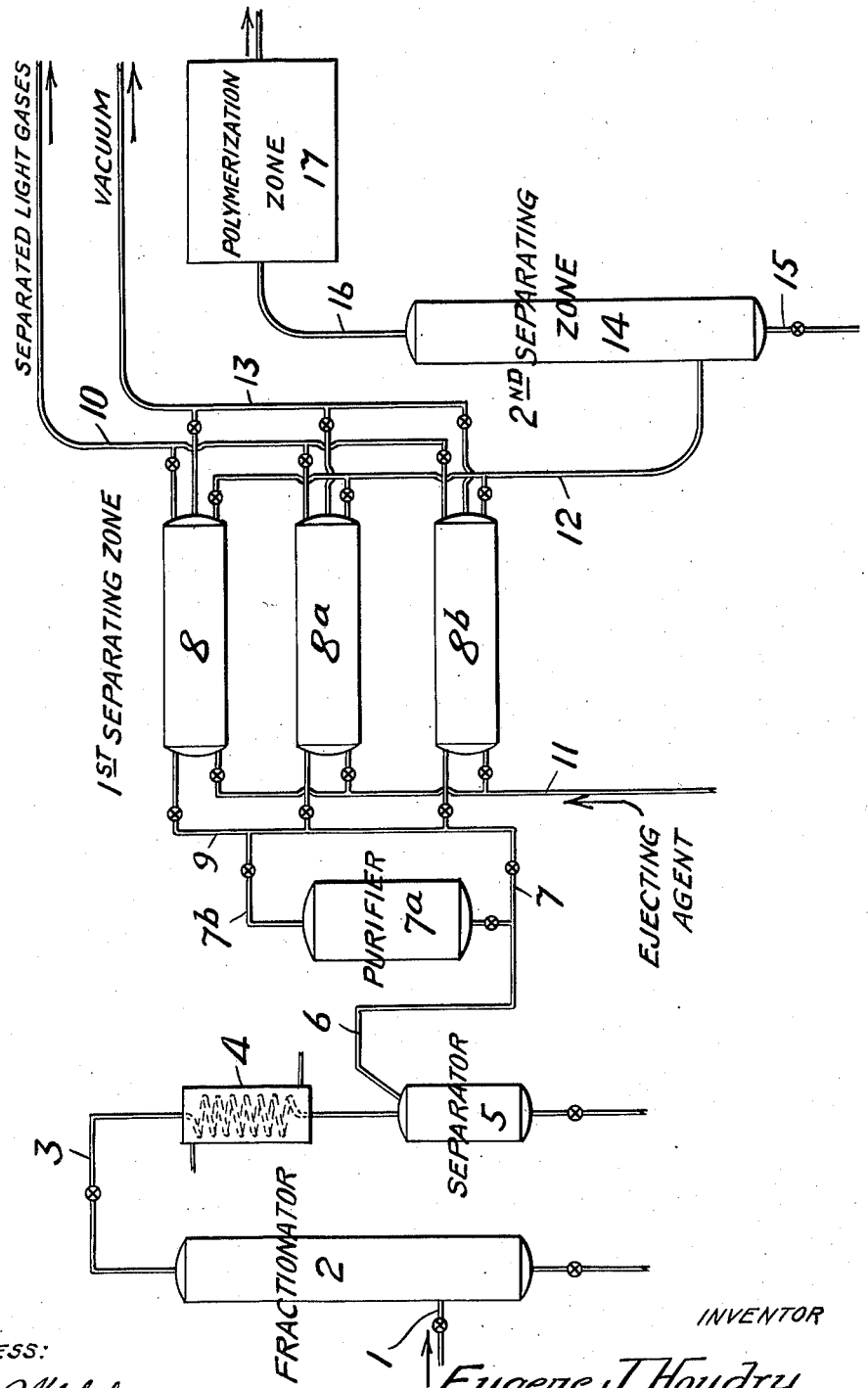

2,190,662

UNITED STATES PATENT OFFICE 2,190,662

PREPARATION OF GASES FOR POLYMERIZATION

Eugene J. Houdry, Philadelphia, Pa., assignor to Houdry Process Corporation, Dover, Del., a corporation of Delaware Application May 1, 1935, Serial No. 19,159

4 Claims. (Cl. 196—10)

This invention relates to the polymerization of gases and more particularly to the selection of the material and to its preparation for the polymerizing operation.

For the production of motor fuels and other liquid hydrocarbons from gases, the usual sources of supply of raw material are natural gases from wells or those produced artificially by such operations as the topping of crude oils, the conversion, transforming, dissociation, synthesis, etc. of hydrocarbon materials such as bitumens, mineral oils, their derivatives and residues. In any case, the mixed gases and vapors thus available usually contain a relatively minor percentage of material capable of polymerization into liquid state without excessive cost. Therefore it is desirable to devise suitable and inexpensive methods and means for separating out the very light or fixed gases which are not readily susceptible of polymerization as well as any small amounts of heavier material which may be present in vapor phase through entrainment, since the processing of such materials in apparatus adapted to act upon an intermediate range of hydrocarbons is useless as to the first group and unnecessary as to the second group. Furthermore their inclusion requires equipment of greatly increased capacity and its operation is particularly costly when polymerization is effected under pressure. It is, moreover, highly important that the material be freed of sulphur and sulphur compounds which produce undesirable results or products regardless of whether the actual polymerization is effected thermally or catalytically.

One object of the invention is to take gas from any source and to prepare from it in a simple, convenient and economical manner charging material for a polymerizing operation. Another object is to send the charge to the polymerizing zone in clean condition and under suitable pressure. Another object is to avoid the use of pumping equipment to build up the pressure needed for the polymerizing operation. Still other objects will be apparent from the detailed description which follows.

In its essentials, my improved process involves the steps of (1) purifying the gases, (2) removing all light or fixed gases containing no carbon, also all hydrocarbons of the group containing one carbon atom and permissibly a part of the hydrocarbons of the group containing two carbon atoms, and then (3) removing hydrocarbons of the five carbon group and heavier. The steps need not be taken in the order given although that is preferred, and, if the material is already clean, the first step may be omitted. A fourth (4) step involves the imposing upon the selected charge of any desired pressure. Steps (3) and (4) may be effected together. The pressure step (4) may be produced by an extraneous fluid, such as steam, for example. Besides imposing the desired pressure on the charge, it may have other functions, such as acting as a purging or ejecting agent, if contact masses having selective adsorptive ability are utilized to remove from the original or purified gas stream the components capable of polymerization; it may also assist in the separation of the heavy hydrocarbons. In certain instances the gases may be substantially free of sulphur compounds either naturally or from a previous operation so that the first (1) or purifying step is not needed.

In the accompanying drawing, which illustrates diagrammatically one arrangement of apparatus for practising the invention, gases and vapors from any source (such as crude oil topping unit, a cracking plant, coking unit, etc.) are discharged by a line 1 into a fractionator 2, the overhead material passing by line 3 to a condenser 4 and thence into a separator 5 for the removal of the greater part of the liquid products in the overhead material. A gas vapor line 6 leads from separator 5 and conducts from the previously disclosed conventional apparatus the raw material which is to be subjected to my improved process.

If the raw material happens to be clean, i. e., substantially free of sulphur compounds, it passes directly to a first separating zone by line 7. If the material contains sulphurous compounds, it is sent through a purifier 7a of any known or suitable type, physical, catalytic or chemical, for removing hydrogen sulphide and other compounds which are likely to react in the subsequent polymerizing operation with the hydrocarbons to produce mercaptans and other highly undesirable compounds. From purifier 7a, the purified gases are conducted by a line 7b to the first separating zone.

Although fractionation can be utilized in the first separating zone to effect removal of substantially all light or fixed gases and permissibly including a part of the hydrocarbons of the group containing two carbon atoms, I propose to use contact material such as charcoal, coke, silica gel, activated alumina, and the like, having selective adsorptive ability, which will permit the aforesaid gases to pass through, while retaining adsorbed in their pores hydrocarbons of the two and three carbon atom groups and heavier. As indicated in the drawing, three containers 8, 8a and 8b for the adsorptive material are shown, although any desired number may be used. These containers receive clean gas from lines 7 or 7b through suitable valved connections to a trunk line 9 and the gases which are not adsorbed leave the containers by suitable valved connections to a trunk line 10 which conducts the gases away to be burned or otherwise utilized. By providing a plurality of containers, it is possible to conduct the operation continuously, one container, such as 8, for example, receiving the charge from trunk line 9 and discharging the undesired and separated gases out through trunk 10; while another container, such as 8a, is having the adsorbed material ejected therefrom as by a suitable ejecting agent, such as steam, preferably admitted under high pressure from line 11, the ejected gases passing from the container into a trunk line 12, while still a third container, such as 8b, is being freed of any of the ejecting agent contained therein by the action of a vacuum through a connection to vacuum line 13 to prepare the container to again receive the charge from line 9. The containers are thus used in rotation as indicated.

The ejecting agent may be utilized to put the gases ejected from containers 8, 8a, 8b under any desired pressure, this pressure being determined by that required by the subsequent polymerizing operation, so that later imposition of pressure by other means, such as pumps, may be avoided. The gases issuing from the containers in sequence into line 12 are sent into a second separating zone to effect removal of the hydrocarbons of the five carbon group and heavier. This zone may comprise a fractionating tower 14 which operates under the pressure imposed upon the charge thereto by the ejecting agent, the heavy separated material being removed as bottoms through the valved line 15 while the selected material comprising predominantly the hydrocarbons of the two, three and four carbon groups, under the pressure imposed thereon by the ejecting agent, is discharged from fractionator 14 by overhead line 16 to storage under pressure or directly into the polymerizing zone indicated diagramatically at 17, which may be of any suitable or known type, or into a cracking zone as a preliminary step to polymerization.

It is to be understood that the apparatus diagrammatically indicated in the accompanying drawing is illustrative rather than limiting. The purifying (if required) and the first separation is preferably effected under low or moderate pressures, as merely that necessary to send the charge through the apparatus or normally not to exceed 75 pounds. The second separating operation takes place under conditions determined somewhat by the composition of the material but preferably at a relatively high pressure, as from 150 pounds per square inch, gauge, up, the pressure selected being that required for the polymerizing operation which is to follow.

An important feature of the present invention resides in the fact that the original charge of all available gas is not subjected to the polymerizing operation, but that there is a selective separation of material with the removal of the parts which cannot be polymerized and which do not require polymerization, together with the purification at least of those parts capable of polymerization and the delivery of the purified and selected constituents capable of polymerization to the polymerizing zone at the required pressure imposed by a gaseous medium such as steam which has been utilized in one or more of the operations in the preparation of the final material.

I claim as my invention:

1. In the preparation of hydrocarbon gases for polymerization from a gaseous source material which is substantially free of entrained liquid and low in sulfur compounds, and which contains unsaturated hydrocarbons and some saturated hydrocarbons within the two, three and four carbon groups along with both higher and lower boiling materials, the steps of process which comprise passing the gaseous source material over an adsorptive contact mass capable of retaining hydrocarbons of the two carbon group and heavier, periodically interrupting the flow of the said gaseous source material to said adsorptive mass and passing an inert gaseous agent thereinto at a pressure substantially above that at which said gaseous source material is supplied thereto, so as to eject the adsorbed hydrocarbon gases therefrom in a stream under desired pressure, then removing from the said stream of ejected gases hydrocarbons of the five carbon group and heavier while leaving substantially all of the remaining gases uncondensed, passing a stream of the last-mentioned uncondensed gases under the pressure imposed by said gaseous ejecting agent into a confined zone maintained under conditions so as to effect a polymerization of unsaturates in the last named stream, and performing the above steps in the order recited, so as economically to prepare a high grade gaseous charge for polymerization under pressure and consisting substantially only of hydrocarbons within the two, three and four carbon groups.

2. In the preparation of hydrocarbon gases for polymerization from a gaseous source material which is substantially free of entrained liquid and low in sulfur compounds, and which contains unsaturated hydrocarbons and some saturated hydrocarbons within the two, three and four carbon groups along with both higher and lower boiling materials, the steps of process which comprise passing the gaseous source material over an adsorptive contact mass capable of retaining hydrocarbons of the two carbon group and heavier, periodically interrupting the flow of the said gaseous source material to said contact mass and passing steam as an inert, non-hydrocarbon gaseous agent thereinto under a pressure substantially above that at which said gaseous source material is supplied thereto so as to eject the adsorbed hydrocarbon gases therefrom in a stream under desired pressure, continuously separating from the said stream of ejected gases hydrocarbons of the five carbon group and heavier while the said inert gaseous ejecting agent remains admixed with the said ejected hydrocarbon gases, and continuously passing a stream of the remaining portion of the said ejected gases, consisting substantially of hydrocarbons within the two, three and four carbon groups, in admixture with said ejecting agent and under the pressure supplied thereby, as a reactant charge for polymerization into a polymerizing zone in gaseous phase, said zone being maintained under conditions so as to effect a polymerization of unsaturates in the last-named stream into higher boiling hydrocarbons, said steps to be performed in the order recited and said inert ejecting agent being passed into said adsorptive mass at a pressure sufficiently high so that the aforesaid reactant charge for polymerization will enter the said polymerizing zone at desired high pressure without the need for any other step of pressure increase.

3. In the preparation of hydrocarbon gases for polymerization from a gaseous source material which is substantially free of entrained liquid and low in sulfur compounds, and which contains unsaturated hydrocarbons and some saturated hydrocarbons within the two, three and four carbon groups along with both higher and lower boiling materials, the steps of process which comprise passing the gaseous source material, at a pressure relatively low as compared with that desired in the polymerization step defined hereinbelow, over an adsorptive contact mass capable of retaining hydrocarbons of the two carbon group and heavier, periodically interrupting the flow of the said gaseous source material to said contact mass and passing steam thereinto under a pressure at least as great as 150 lbs. per square inch gauge to eject the adsorbed hydrocarbon gases therefrom in a stream and place them under desired high pressure, continuously separating from the ejected stream of gases hydrocarbons of the five carbon group and heavier while leaving substantially all of the remaining portions of the gases uncondensed, and continuously passing a stream of said remaining portion of the said ejected gases, consisting substantially of hydrocarbons within the two, three and four carbon groups, in admixture with steam and under the pressure supplied thereby into a polymerizing zone in substantially gaseous phase, said polymerizing zone being maintained under conditions so as to effect polymerization of unsaturates in the last-named stream into higher boiling hydrocarbons and the aforesaid steps being performed in the order recited.

4. In the preparation of hydrocarbon gases for polymerization from a gaseous source material which is substantially free of entrained liquid and low in sulfur compounds, and which contains unsaturated hydrocarbons and some saturated hydrocarbons within the two, three and four carbon groups along with both higher and lower boiling materials, the steps of process which comprise maintaining a plurality of separate confined zones, each containing an adsorptive contact mass capable of retaining hydrocarbons of the two carbon group and heavier, continuously passing the gaseous source material into one of said confined zones for a period of time, during which a portion of the hydrocarbons of the two carbon group and heavier hydrocarbons are adsorbed by and retained in said mass and other lighter portions of said gaseous source material continuously pass from said zone; at the end of said period, when said mass is saturated to a high degree with adsorbed hydrocarbons, stopping the passage of gaseous source material into said one confined zone and passing it into a second one of said plurality of confined zones; following stopping the passage of said gaseous source material to said one confined zone, introducing steam as a gaseous ejecting agent thereinto under a high pressure to eject the adsorbed hydrocarbons therefrom; the steps of passing said gaseous source material and said inert gaseous ejecting agent into said confined zones being sequentially arranged so as to provide a continuous out-going stream of ejected hydrocarbon gases of the two carbon group and heavier; continuously separating hydrocarbons of the five carbon group and heavier from the said out-going stream of ejected hydrocarbon gases without substantially condensing the remaining portions or lighter hydrocarbons in said stream and carrying out such separation while at least a portion of said inert gaseous agent remains admixed with the said ejected hydrocarbon gases; and continuously passing said remaining portion of the said ejected hydrocarbon gases, consisting substantially of hydrocarbons within the two, three and four carbon groups, in gaseous phase in admixture with said ejecting agent and under the pressure supplied thereby as a reactant charge for polymerization into a polymerizing zone, said steps to be performed in the order recited, so as economically to provide a continuous stream of favorable reactants to a polymerizing zone while utilizing the inert gaseous agent employed in the first separating or ejecting step also to maintain the pressure of reactants entering the polymerizing zone at the desired level.

EUGENE J. HOUDRY.